Oct. 21, 1947.　　　A. H. EMERY　　　2,429,511
DIAL BORE GAGE
Filed Oct. 29, 1945
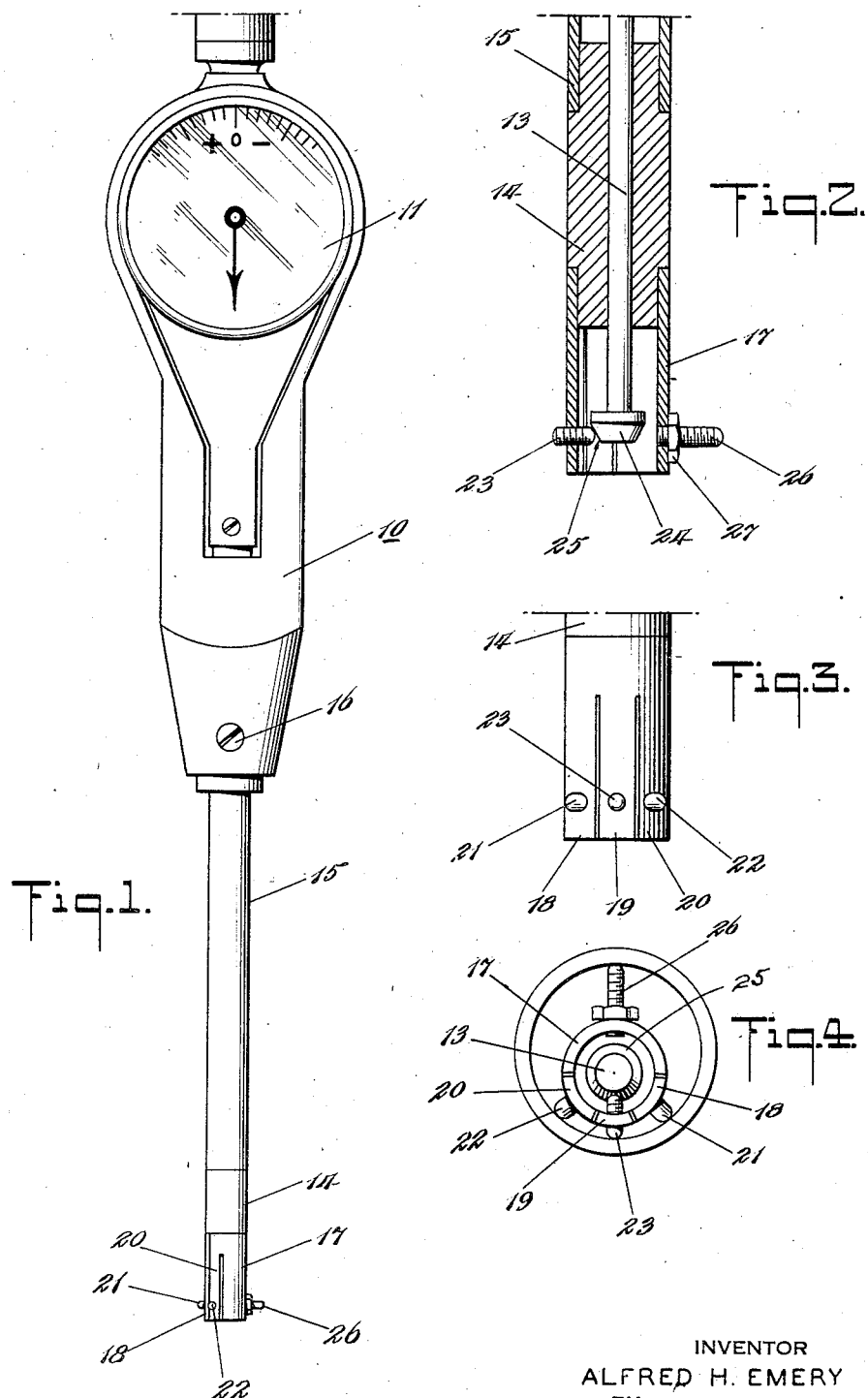
INVENTOR
ALFRED H. EMERY
BY Darby & Darby
ATTORNEYS Patented Oct. 21, 1947

2,429,511

UNITED STATES PATENT OFFICE 2,429,511

DIAL BORE GAGE

Alfred Hamilton Emery, Wappingers Falls, N. Y., assignor to Standard Gage Company, Inc., Poughkeepsie, N. Y., a corporation of New York Application October 29, 1945, Serial No. 625,289

3 Claims. (Cl. 33—178)

The present invention relates to bore gages and especially to such bore gages utilizing a dial indicator as the indicating element. More particularly still, the invention relates to a dial bore gage adapted for the gaging of extremely small bores. In the past it has been impossible to utilize a dial bore gage for gaging small bores since the usual construction of such gages was such that their dimensions were relatively great and consequently the smaller holes of the bores had to be gaged in other manners as by the use of small plug gages.

The main object of the present invention is to provide a dial bore gage of the dial indicator type which is capable of measuring the interior diameter of very small holes, for example, holes ranging approximately from $5/8$ of an inch down to approximately $3/16$ of an inch.

Another object of the present invention is to provide a dial bore gage capable of measuring small bores in which one of the measuring elements is replaceable so that the range of the instrument may be varied.

A further object of the present invention is to provide a dial bore gage which shall be simple and sturdy in construction and which can be readily and economically manufactured.

Other objects and features of the invention will be apparent when the following description is considered in connection with the annexed drawings, in which—

Figure 1 is a front elevation of the dial bore gage of my invention;

Figure 2 is a vertical cross section of the lower end of the gage of Figure 1 showing the construction of the measuring element of the gage;

Figure 3 is an enlarged side elevation of the lower end of the gage showing the exterior view of the measuring element; and Figure 4 is an end view of the gage applied to a bore illustrating the mode of operation thereof.

Referring now to the drawings the gage of my invention comprises a housing 10 in which is placed a dial indicator of common form designated 11. The measuring plunger of this gage extends downwardly as seen in Figure 1 and makes contact with a plunger 13, see Figures 2 and 4, which plunger is supported for reciprocating motion in the bushing 14. A sleeve 15 is fitted to the bushing 14 at its upper end and is held in the housing by means of a set screw 16, Figure 1. At the lower end of the bushing 14 another sleeve 17 is provided, this sleeve being of resilient material and being split to provide the three fingers 18, 19, and 20. The sections 18 and 20 are wider than section 19 and are used as will hereinafter appear as locating elements while the central section 19, which is narrower and thus more resilient, provides the actual contact element. The two sections 18 and 20 have buttons 21 and 22 thereon which make contact with the interior of the bore and locate the gage in the bore, see Figure 4.

The central resilient section 19 of the sleeve 17 is provided with a button 23 which is one of the two measuring buttons. This button is threaded into the resilient section 19 and a round portion thereof makes contact with the head 24 of the plunger 13. It will be seen that as a result of this construction and furthermore as a result of the 45° surface 25 of the plunger head 24, any movement of the button 23 and section 19 is transmitted through the plunger head and plunger 13 to the dial indicator 11.

Diametrically opposite to the contact button 23 there is placed in the sleeve 17 an additional contact button 26, this button being threaded into the sleeve and locked in its set position by means of the lock nut 27. As will be seen, particularly by reference to Figure 4, the buttons 22 and 21 are resiliently pressed outwardly and serve to locate the gage in such a position that the buttons 23 and 26 are located on a diameter of the bore to be gaged. Consequently, any movement of the resilient center section 19 due to contact of the button 23 with the bore wall will be along a diametrical line and will result in equal movement of the plunger 13. Since the plunger 13 bears against the normal plunger of the dial indicator 11 the result will be that the amount of movement is directly measured.

Although in the present instance the face of plunger 13 is cut at a 45° angle so that the movement of the contact button 23 will result in equal movement of the plunger 13, it will be clear that this angle may be varied provided that the indicator is so made as to have a ratio of movement which counteracts for the discrepancy thus caused.

It will also be clear that by replacing the button 26 by a longer or shorter button the gage may be used in a larger or smaller bore and that, consequently, the range of the gage may be extended by providing a plurality of buttons 26 of different lengths. In the usual manner the gage is set by the use of a gaging ring or through the utilization of a comparator and Johansson blocks or in any other convenient manner.

While I have described a preferred form of my invention it will be clear that other forms

What is claimed is:

1. In a dial bore gage adapted to the measuring of small bores, in combination, a dial indicator, a housing for said indicator, an extension on said housing, a plunger mounted in said extension for reciprocating movement, said plunger making contact with the plunger of the dial indicator, a terminating end for said housing extension, said end comprising a sleeve of resilient material, said sleeve being longitudinally slotted at its terminating end to provide a relatively rigid section comprising a major part of the sleeve circumference and three relatively resilient fingers comprising minor portions of the sleeve circumference, one of which is diametrically opposite said relatively rigid section, means mounted on said fingers for making contact with the wall of the bore to be gaged and means mounted on said relatively rigid section for making contact with the wall of the bore to be gaged and cooperating with one of said other contact means for measuring diametrically across the bore.

2. A dial bore gage comprising a dial indicator having a plunger, a housing for said indicator, a sleeve of resilient material mounted in said housing, a plunger mounted in said sleeve for reciprocating movement with respect thereto, said reciprocating plunger bearing against the plunger of the dial indicator, said reciprocating plunger having an inclined face thereon at the end remote from the dial indicator, slots in said sleeve at the end adjacent said plunger face, said slots dividing the terminating portion of said sleeve into four parts, one of said parts comprising a major portion of the circumference of said sleeve and being relatively rigid, another of said parts comprising a minor portion of said sleeve and being diametrically opposite said first mentioned part, a contact button mounted on each of said parts of said resilient sleeve, and means mounted on the said part of said sleeve diametrically opposite to the contact button on the rigid part for making contact with the said inclined face of said plunger whereby movement of said one resilient part is effective to move said plunger and cause indicating movement of the plunger of said dial indicator.

3. A dial bore gage comprising a dial indicator having a plunger, a housing for said indicator, a sleeve mounted in said housing, a plunger mounted in said sleeve for reciprocating movement with respect thereto, said reciprocating plunger bearing against the plunger of the dial indicator, said reciprocating plunger having an inclined face thereon at the end remote from the dial indicator, four slots in said sleeve at the end adjacent said plunger face, said slots dividing the terminating portion of said sleeve into four parts, one of said parts comprising a major portion of the circumference of said sleeve and being relatively rigid, the second of said parts being comprised of a minor portion of said circumference and being relatively resilient, the remaining two parts each comprising a greater portion of the circumference than said last mentioned part and being less resilient, said most resilient part having its longitudinal center line diametrically opposite the center line of said relatively rigid part, contact means mounted on each of said parts, said means on said major circumferential part being adjustable, and means on said smallest circumferential part for making contact with said inclined face of said reciprocating plunger whereby said gage is centered in the bore to be measured by means of the contact members on said intermediately resilient parts and measuring movement is caused on said part of greatest resiliency, said measuring movement being in a diametric direction and being transmitted through said inclined portions and said plunger to said indicator.

ALFRED HAMILTON EMERY.

REFERENCES CITED

The following references are of record in the file of this patent:

UNITED STATES PATENTS

| Number | Name | Date |
| --- | --- | --- |
| 1,633,807 | Darlington | June 28, 1927 |
| 1,652,854 | Darlington | Dec. 13, 1927 |
| 1,667,169 | Ruck et al. | Apr. 24, 1928 |
| 2,385,122 | Worthen | Sept. 18, 1945 |